T. E. LEWIS.
FRICTION TRANSMISSION GEARING FOR MOTOR VEHICLES.
APPLICATION FILED FEB. 26, 1913.
1,117,067.          Patented Nov. 10, 1914.
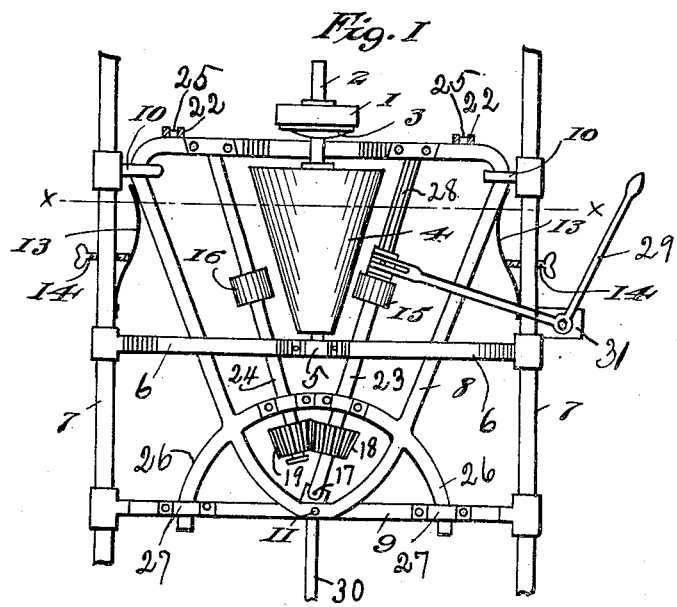
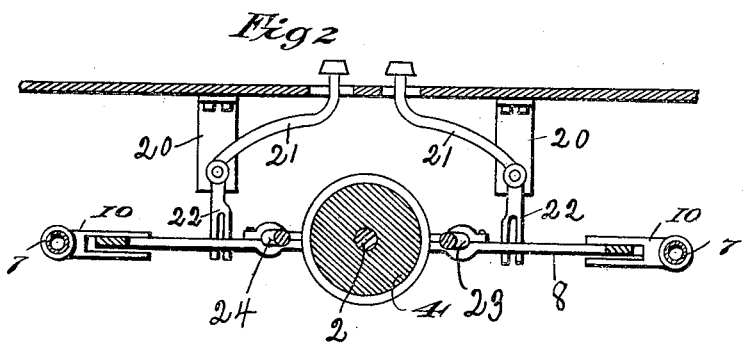
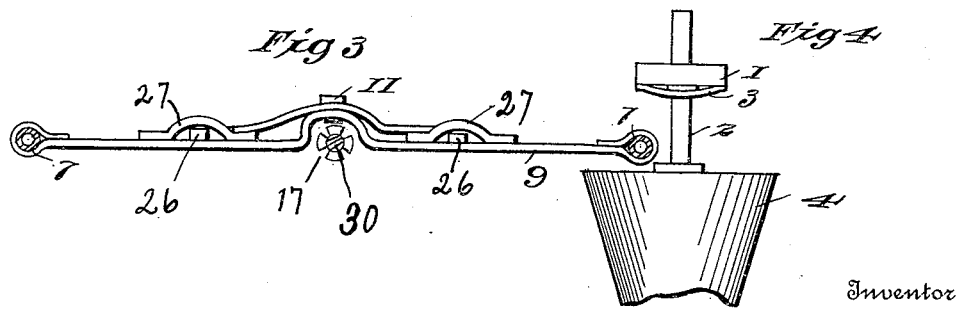

UNITED STATES PATENT OFFICE.

THOMAS E. LEWIS, OF FORT WORTH, TEXAS.

FRICTION TRANSMISSION-GEARING FOR MOTOR-VEHICLES.

1,117,067. Specification of Letters Patent. Patented Nov. 10, 1914.

Application filed February 26, 1913. Serial No. 750,711.

*To all whom it may concern:*

Be it known that I, THOMAS E. LEWIS, a citizen of the United States, residing at Fort Worth, in the county of Tarrant and State of Texas, have invented certain new and useful Improvements in Friction Transmission-Gearing for Motor-Vehicles, of which the following is a specification.

This invention relates to a power transmitting gearing for motor vehicles, and more particularly to friction transmission gearing for varifying the speed and for reversing purposes, and the object is to provide a simple and easily operated speed varying device which will vary the speed to any degree desirable, and to provide a simple device for changing from forward drive to reverse and vice versa. Other objects and advantages will be fully explained in the following description, and the invention will be more particularly pointed out in the claims.

Reference is had to the accompanying drawings, which form a part of this application.

Figure 1 is a plan view of the improved gearing. Fig. 2 is a vertical cross section on the line $x$—$x$ of Fig. 1. Fig. 3 is a front elevation of the guiding devices shown in Fig. 1. Fig. 4 is a detail view illustrating the connection of the transmission gearing to the drive wheel of the engine.

Similar characters of reference are used to indicate the same parts throughout the several views.

This application revives in part my abandoned application filed May 24th, 1909, Ser. No. 497,983.

In the drawings 1 indicates the fly wheel of a propelling engine and the transmission driving shaft 2 is connected to the fly wheel 1 by a disk 3, which is bolted to the wheel 1. A cone shaped friction drive wheel 4 is rigidly mounted on the shaft 2. The shaft 2 is journaled in a bearing 5 which is mounted on a hanger 6 which is hung on the frame pieces 7. A shifting frame 8 is mounted on the cross bar 9 which is mounted on frame pieces 7. The shifting frame 8 is also supported in slotted bearings 10 which are attached to frame pieces 7, and this frame piece 8 is pivotally connected to the cross bar 9 by a pivot bolt 11. It will be seen that the shifting frame 11 can be removed by simply taking out the pivot bolt 11. Springs 13 are attached to the frame pieces 7 and bear against the shifting frame for holding the shifting frame centrally between the frame pieces 7. Set screws 14 may be used to increase or decrease the tension of the springs 13. The shifting frame 8 may be moved to the right or to the left by pressing on a foot lever 21 which is pivotally mounted on a hanger 20 and provided with a fork 22 for engaging a pin 25 in the frame piece 8. A main drive wheel 4 is mounted on the shaft 2. This drive wheel 4 is cone shaped for the purpose hereinafter indicated. A shaft 23 is journaled in the shifting frame 8 and provided with a friction pulley 15 adapted to engage the main drive wheel 4. The shaft 23 is further provided with a beveled pulley 18 and the shaft is coupled to the transmission shafts 30 by a universal joint 17 for driving the shaft 30. The friction pulley 15 may be shifted to different positions on the shaft 23 by a lever 29 which is provided with a fulcrum 31, the shaft 23 having a groove 28 therein so that the friction pulley 15 can be made to turn with the shaft 23. The shifting frame 8 is guided in its lateral movement by slotted bearings 10 and guide arms 26 which operate through the bearings 27. The bearings 27 are attached to the cross bar 9, and the arms 26 move freely through the bearings. The friction pulley 15 is for forward driving. The gearing may be reversed by use of another friction pulley 16 which is mounted on shaft 24. The shaft 24 is journaled in the shifting frame 8 and is provided with beveled pinion 19. All that will be necessary to reverse the driving would be to shift the frame 8 so that the friction pulley 15 would be moved away from the drive wheel 4 and the friction pulley 16 brought in contact with the friction drive wheel 4. This may be done quickly and easily by pressing on the proper foot lever 21. After the reverse is adjusted, the frame 8 may be held in position by holding the foot on the lever 21, or by changing the set screws 14 which bear against the springs 13.

Any convenient housing may be provided for the gearing to protect the same from dirt or dust. It is apparent that the means for shifting the frame which carries the transmission gearing may be varied, and the means for moving the gearing to vary the speed may be placed at different locations. An important feature of this invention is the ready adjustability of the drive and the reverse pulley toward and to the main drive wheel. Another feature is that notwithstanding this adjustability of the drive pulley the surface of the drive wheel 15 is always substantially parallel to the surface of the main drive wheel.

What I claim is,—

1. A transmission gearing for motor vehicles comprising a driving shaft, a friction drive wheel rigid with said shaft, a frame shiftable radially, drive and reverse pulleys carried by said frame adapted to engage said friction drive wheel, yielding members bearing against the sides of said frame and tending normally to hold said pulleys out of gear with said drive wheel, and slotted bearings for said frame to permit lateral motion of said frame.

2. A transmission gearing for motor vehicles having a driving shaft, a friction drive wheel rigid with said shaft, drive and reverse pulleys adapted to engage said drive wheel, a laterally shiftable frame carrying said pulleys, slotted bearings for said frame, and springs pressing against the sides of said frame and tending normally to hold said pulley out of gear with said drive wheel.

3. A transmission gearing for motor vehicles comprising a driving shaft, a main friction drive wheel mounted on said shaft, a vibratable frame pivoted at one end, drive and reverse pulleys provided with shafts journaled in said vibratable frame, beveled gearing operatively connecting the last mentioned shafts, bearings for said frame adapted to maintain said frame in a horizontal position and to permit lateral motion of said frame, and means for shifting the said frame to bring either the drive or the reverse pulley in frictional contact with said main friction drive wheel.

4. A transmission gearing for motor vehicles, comprising a driving shaft, a main friction drive wheel mounted thereon, a coöperating friction drive wheel, a transmission shaft therefor, a horizontal frame shiftable radially and provided with bearings for said transmission shaft whereby the friction surfaces of said wheel may be brought together, guides for said frames, and springs bearing yieldingly against the sides of said frame.

5. A transmission gearing for motor vehicles comprising a driving shaft, a cone shaped friction drive wheel rigid with said shaft, a transmission shaft provided with a universal joint, a coöperating friction drive wheel mounted on said transmission shaft, a frame provided with bearings for said transmission shaft and having a pivotal connection at one end whereby the surfaces of said drive wheels may be brought together, and bearings for said frame to support the same in different horizontal positions, and springs coöperating with said bearings and bearing yieldingly against said frame.

6. A variable speed transmission gearing for motor vehicles having a driving shaft, a cone shaped friction drive wheel rigid with said shaft, a transmission shaft, a shiftable frame carrying bearings for said shaft whereby said shaft may be moved to a position substantially parallel to the friction surface of said wheel, a coöperating friction drive wheel mounted on said transmission shaft, means for moving said wheel to different positions on said transmission shaft for varying the speed of the vehicle, a reversing shaft carried by said frame and operatively connected with said transmission shaft, and a friction wheel mounted on said reversing shaft and adapted when actuated by said frame to engage said cone shaped drive wheel.

7. A transmission gearing for motor vehicles comprising a driving shaft, a cone shaped friction drive wheel rigid with said shaft, a shiftable frame pivotally mounted at one end and provided with lateral guides for maintaining said frame in a horizontal position, drive and reverse pulleys carried by said frame adapted to engage said friction drive wheel, and slotted bearings for said frame to permit lateral motion of said frame.

In testimony whereof, I set my hand in the presence of two witnesses, this 2nd day of January, 1913.

THOMAS E. LEWIS.

Witnesses:
A. L. JACKSON,
J. W. STITT.

Copies of this patent may be obtained for five cents each, by addressing the "Commissioner of Patents, Washington, D. C."